Patented Feb. 27, 1945

2,370,144

UNITED STATES PATENT OFFICE 2,370,144

PREPARATION OF MOTOR FUEL

Robert E. Burk, Cleveland Heights, Ohio, assignor to The Standard Oil Company, Cleveland, Ohio, a corporation of Ohio No Drawing. Application June 11, 1941, Serial No. 397,605

5 Claims. (Cl. 196—54)

This invention relates to the production of light hydrocarbons, such as motor fuel, by reaction at relatively low temperature; and it is among the objects of the invention to provide improved procedure and with particular manufacturing convenience.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The invention will be understood from an illustrative example: 0.395 mols of paraffin wax ($C_{25}H_{52}$) are reacted with 3.43 mols of butane at 60° C. in the presence of 13 mol per cent of aluminum bromide, and HBr introduced to maintain the pressure at 150 pounds per square inch. After reaction for about twenty-four hours, the hydrogen bromide is removed and the aluminum bromide is frozen out, and the hydrocarbon product fractionated, around 29 per cent of the wax being converted to gasoline.

In the catalytic zone the hydrocarbons of the wax are cracked, forming unsaturated fragments which promptly combine with the gaseous hydrocarbons supplied.

Paraffin wax may be of refined grade or of lower grade as preferred in any given instance, and gaseous hydrocarbons of four carbon atoms and less. Normal butane, isobutane, propane, ethane, methane or mixtures may be employed. The gaseous hydrocarbons may be from pyrolytic cracking, or from a halide catalytic zone preferably in the presence of hydrogen, or from catalytic cracking with silicate, silica gel and the like, or the gases may be from natural gas or refinery gas. The catalyst may be an acid catalyst or a supported catalyst, or particularly where a butane gas is used it may be a powerful halide catalyst, such as aluminum bromide, aluminum chloride, zirconium halides, or their complexes, and therewith a hydrogen halide and/or other promoter is applied, as hydrogen bromide or hydrogen fluoride or chloride, the hydrogen halide being of convenience also to control the amount of the pressure, if pressure is desired. Pressure in the reaction zone may be for instance 50–150 pounds or more per square inch. Reaction is carried out at a temperature generally not exceeding 150° C., and preferably lower, through a range down to minus 100° C. The temperature of reaction in this process is thus in contrast to the temperatures customarily applied for making motor fuel, being below the end boiling point of gasoline, and being low for a halide catalyst; but surprising activity results from the temperature combination and such large amounts of supplied gas and halide and promoter. In some cases the operation may be in the presence of a homogenizing solvent. After the reaction has been completed, the catalyst is separated out and the hydrocarbon product is fractionated to obtain the motor fuel, and heavy and light ends may be re-cycled to the reaction zone.

Instead of paraffin wax lower molecular weight hydrocarbons may be applied wherein the chain length in any case is sufficient to supply cracked unsaturated nascent fragments capable of reacting with the gaseous chains into the motor fuel boiling range. For instance, a paraffinic fraction corresponding in general to $C_{16}H_{34}$, and isobutane at a rate of 6.9 mols per mol of the heavier hydrocarbon, treated with 10 mol per cent of aluminum bromide and hydrogen bromide with a partial pressure of 10 pounds per square inch, the reaction temperature being 20–25° C., the total pressure being 61 pounds per square inch, shows around a 20 per cent conversion to motor fuel in 48 hours.

The high boiling hydrocarbons or the gaseous materials or both may contain unsaturates. These will alkylate.

Where operating with halide catalysts if the raw material contains aromatic hydrocarbons, these desirably are removed, as by solvent extraction, hydrogenation, complex formation, etc. With catalysts which do not form inactive complexes with aromatics it is in general not necessary to preliminarily remove aromatics from the raw material.

It will be readily recognized that the present process is quite distinct over proposals that have been made to treat a polymer, such as dodecane, in the presence of a gaseous hydrocarbon, with boron fluoride. The latter kind of catalyst is not a cracking catalyst such as in the present process, and the present process involves in its special lines, isomerizing, then cracking of the high molecular component, and alkylating, with reacting of the initial extremes to the gasoline range.

Other modes of applying the principle of the invention may be employed, change being made as regards the details described, provided the features stated in any of the following claims, or the equivalent of such, be employed.

I therefore particularly point out and distinctly claim as my invention:

1. A process of making gasoline from wax, which comprises reacting a substantial mol excess of a butane with paraffin wax in the presence of aluminum bromide and a substantial pressure of hydrogen bromide at a temperature below the end boiling point of gasoline.

2. A process of making gasoline from wax, which comprises reacting a substantial mol excess of hydrocarbons of four carbon atoms with paraffin wax in the presence of aluminum bromide and a substantial pressure of hydrogen bromide at a temperature below the end boiling point of gasoline.

3. A process of making motor fuel, which comprises reacting a substantial mol excess of a butane and a high molecular weight hydrocarbon free from aromatics, in the presence of an aluminum halide catalyst and a substantial pressure of a hydrogen halide promoter and at a temperature not over 150° C.

4. A process of making motor fuel, which comprises reacting a substantial mol excess of a butane with a high molecular weight hydrocarbon free from aromatics, 'n the presence of a metallic halide catalyst and a substantial pressure of a hydrogen halide promoter and at a temperature not over 150° C.

5. A process of making motor fuel, which comprises reacting a substantial mol excess of a paraffinic hydrocarbon having not more than 4 carbon atoms with a high molecular weight hydrocarbon free from aromatics, in the presence of a promoted metallic halide catalyst, and at a temperature not over 150° C.

ROBERT E. BURK.